(12) United States Patent
Lee et al.

(10) Patent No.: US 7,086,139 B2
(45) Date of Patent: Aug. 8, 2006

(54) METHODS OF MAKING MAGNETIC WRITE HEADS USING ELECTRON BEAM LITHOGRAPHY

(75) Inventors: Kim Y. Lee, Fremont, CA (US); Jyh-Shuey Jerry Lo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 190 days.

(21) Appl. No.: 10/836,136

(22) Filed: Apr. 30, 2004

(65) Prior Publication Data

US 2005/0241139 A1    Nov. 3, 2005

(51) Int. Cl.
*G11B 5/127* (2006.01)
*G11B 5/187* (2006.01)

(52) U.S. Cl. .............. 29/603.07; 29/603.12; 29/603.13; 29/603.15; 29/603.18; 360/122

(58) Field of Classification Search ........... 29/603.07, 29/603.12, 603.13, 603.15, 603.18; 205/119, 205/122, 135; 360/126, 317, 113, 109; 216/22, 216/40, 66, 79
See application file for complete search history.

(56) References Cited

U.S. PATENT DOCUMENTS

| | | | |
|---|---|---|---|
| 4,017,965 A | | 4/1977 | Brutsch et al. |
| 4,192,985 A | | 3/1980 | Berghof et al. |
| 4,436,593 A | | 3/1984 | Osborne et al. |
| 4,878,290 A | | 11/1989 | Masud et al. |
| 5,404,635 A | | 4/1995 | Das |
| 5,438,747 A | * | 8/1995 | Krounbi et al. .......... 29/603.16 |
| 5,578,342 A | | 11/1996 | Tran et al. |
| 5,804,085 A | | 9/1998 | Wu et al. |
| 5,809,637 A | * | 9/1998 | Rottmayer ............... 29/603.15 |
| 5,874,010 A | | 2/1999 | Tao et al. |
| 5,916,424 A | | 6/1999 | Libby et al. |
| 6,018,443 A | * | 1/2000 | Watanabe et al. .......... 360/319 |

(Continued)

FOREIGN PATENT DOCUMENTS

JP        3076012        4/1991

(Continued)

OTHER PUBLICATIONS

Manufacture of Thin Film Magnetic Head, IBM Technical Disclosure Bulletin, Aug. 1981, p. 1470.

*Primary Examiner*—A. Dexter Tugbang
*Assistant Examiner*—Tai Nguyen
(74) *Attorney, Agent, or Firm*—John J. Oskorep, Esq.; Rambod Nadar

(57) ABSTRACT

A pedestal is formed over a first pole piece layer and insulator materials are formed to surround it. A gap layer made of a non-magnetic insulator or metal is then formed over the pedestal and the insulator, followed by the optional formation of a seed layer. A second pole piece is formed over the gap layer with or without the seed layer by forming a patterned resist using E-beam lithography and electroplating second pole piece materials within the patterned resist. After milling to remove side portions of the gap layer and the optional seed layer, a chemical etch is performed to remove a top portion of the insulator materials. The pedestal is then notched and trimmed by ion milling using the second pole piece as a mask to form a central notched structure. Since the second pole piece is precisely centered over the pedestal prior to notching, the pedestal is notched symmetrically to form a notched structure having side walls with angled slopes.

29 Claims, 13 Drawing Sheets

U.S. PATENT DOCUMENTS

| | | | |
|---|---|---|---|
| 6,119,331 A * | 9/2000 | Chang et al. ............ 29/603.14 |
| 6,172,848 B1 | 1/2001 | Santini |
| 6,199,267 B1 | 3/2001 | Koshikawa et al. |
| 2001/0012541 A1 | 8/2001 | Sasaki et al. |
| 2001/0028917 A1 | 10/2001 | Sasaki |
| 2002/0024766 A1 | 2/2002 | Sasaki et al. |

FOREIGN PATENT DOCUMENTS

| | | |
|---|---|---|
| JP | 7235016 | 9/1995 |
| JP | 2001256613 | 9/2001 |

\* cited by examiner

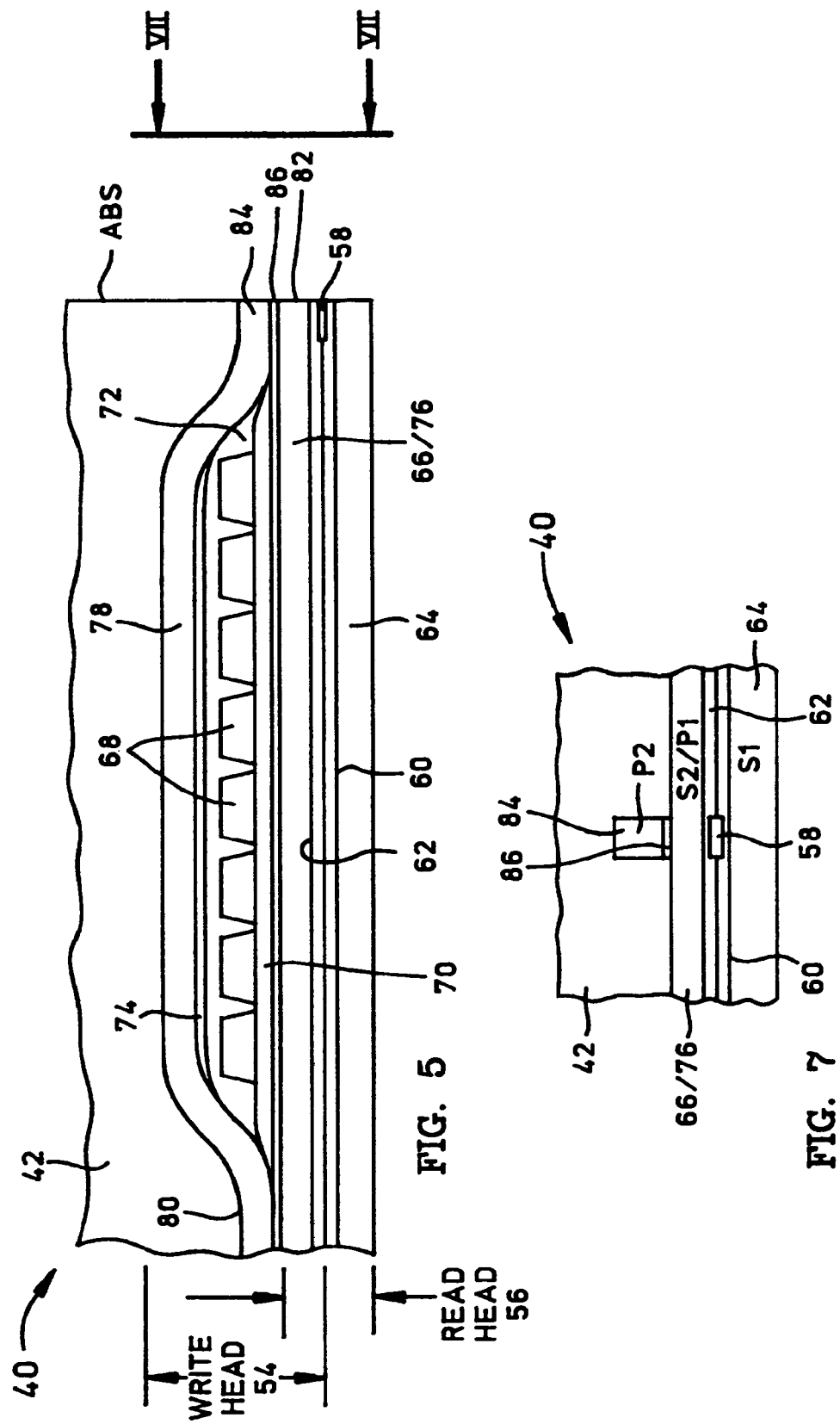

PLATE
FIRST POLE PIECE LAYER
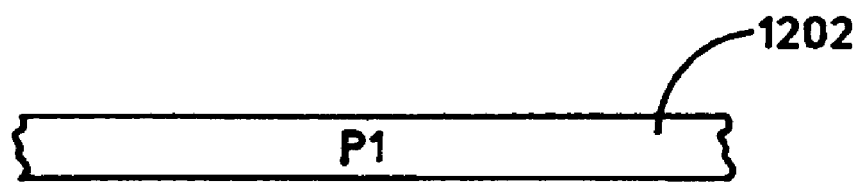
FIG. 12
PLATE PEDESTAL
OVER FIRST POLE PIECE LAYER
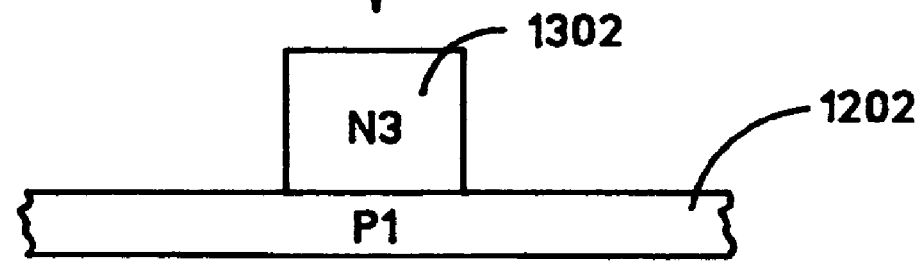
FIG. 13

METHODS OF MAKING MAGNETIC WRITE HEADS USING ELECTRON BEAM LITHOGRAPHY

BACKGROUND OF THE INVENTION

1. Field of the Invention

This invention relates generally to magnetic heads in disk drives, and more particularly to improved methods of making magnetic write heads having notched pole tip structures using electron beam (E-beam) lithography.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces, write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.05 μm.

The second pole, along with its second pole tip, is frame-plated on top of the gap layer. After depositing a seed layer on the gap layer, a photoresist layer is spun on the seed layer, imaged with light, and developed to provide an opening surrounded by a resist wall for electroplating the second pole piece and second pole tip. To produce a second pole tip with a narrow track width, the photoresist layer has to be correspondingly thin.

Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced. When the first pole piece is notched, it has first and second side walls that are aligned with first and second side walls of the second pole tip, so that the first pole piece and the second pole tip have the same track width at the ABS. This minimizes fringing of magnetic fields from the second pole tip laterally beyond the track width (side writing) to a wide expanse of the first pole piece.

A prior art process for notching the first pole piece entails ion beam milling the gap layer and the first pole piece, employing the second pole tip as a mask. According to this prior art process (as typified in U.S. Pat. No. 5,452,164 and U.S. Pat. No. 5,438,747), the gap layer is typically alumina, and the first and second pole pieces and pole tips are typically Permalloy (NiFe). Alumina mills more slowly than Permalloy; thus the top of second pole tip and a top surface of the first pole piece are milled more quickly than the gap layer. Further, during ion milling, there is significant redeposition of alumina on surfaces of the workpiece. The milling ion beam is typically directed at an angle with respect to a normal to the layers, in order that milling and clean-up be done subsequently or simultaneously.

Notching the first pole piece is very time consuming due, in part, to shadowing of the notch sites by the angled milling and by the profile of the second pole tip, as the wafer supporting the magnetic head is rotated. The length of milling time is due more, however, to the large lateral expanse of the first pole piece. Since the top and side walls of the second pole tip are also milled while the first pole piece is being notched, the second pole tip has to be formed with extra thickness and width so that, after notching is completed, the second pole tip is at its target height and target track width. Unfortunately, because of the long time required for notching it is difficult to meet the targets within acceptable tolerances. This lowers the manufacturing yield.

In order to minimize overmilling of the first pole piece, another process removes the gap layer—except for a desired portion between the first and second pole tips—using a wet-etchant or reactive ion mill. After the unwanted portions of the gap layer are removed, the first pole piece is ion milled employing the second pole tip as a mask. This process eliminates significant redeposition of the alumina. A problem with this process, however, is that the etching undercuts the gap layer under the base of the second pole tip, which is a critical area for the transfer of field signals. The undercut regions provide spaces where Permalloy can be redeposited during subsequent ion milling of the first pole piece, or other foreign material can be redeposited upon subsequent milling and clean-up steps. Further, if the track width of the second pole tip is in the order of 1 μm, the etchant may release the second pole tip from the gap layer, thus ruining the head.

In U.S. patent Publication No. US 2003/0179498 A1 entitled "Magnetic Head Having A Notched Pole Piece Structure And Method Of Making The Same" by Hsiao et al., an alternative method of forming a notched pole piece structure is described. This notching method involves ion milling a first pole piece pedestal, using the second pole piece as a mask, to form the pedestal with angled side walls. The notching is performed after the ion milling of insulator materials (alumina) which surround the pedestal. Using this method, the notching is dependent on redeposited alumina material and can be difficult to control. A patterned resist is formed for the second pole piece using photolithography and second pole piece materials are electroplated within the patterned resist. The second pole piece and notched pedestal may not be properly aligned or centered, especially for narrower trackwidths (e.g. less than 1 micron). If the notched pedestal is appropriately formed and substantially symmetric, the magnetic head has suitable overwrite (OW) properties and little if any adjacent track interference (ATI) problems. If the second pole piece is not precisely centered relative the pedestal, the pedestal is formed to be asymmetric by the notching process which may undesirably cause ATI.

Accordingly, what are needed are improved methods to make such magnetic heads.

SUMMARY

Methods of making magnetic write heads using electron beam (E-beam) lithography are described herein. In one illustrative method, a pedestal is formed over a first pole piece layer and insulator materials are formed to surround it. A gap layer made of a non-magnetic insulator or metal is then formed over the pedestal and the insulator, followed by the optional formation of a seed layer. A second pole piece is formed over the gap layer (and the optional seed layer if provided) by forming a patterned resist using E-beam lithography and electroplating second pole piece materials within the patterned resist. Using the E-beam lithography, the second pole piece is centered with precision over the pedestal. After milling to remove side portions of the gap layer (and the optional seed layer if provided), a chemical etch is performed to remove at least top portions of the insulator materials which surround the pedestal. This chemical etch consumes little if any gap layer or pedestal materials. The pedestal is then notched and trimmed by ion milling using the second pole piece as a mask to form a central notched structure having side walls with angled slopes. The central notched structure results in improved writing performance of the magnetic write head. Since the second pole piece is precisely centered over the pedestal prior to the notching, the pedestal is notched substantially symmetrically with much less second pole piece material being consumed by the ion milling.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V—V of FIG. 2;

FIG. 7 is a partial ABS view of the slider taken along plane VII—VII of FIG. 5 to show the read and write elements of the magnetic head;

FIG. 12 is the first of a series of illustrations which are used to described a method of making a magnetic head in accordance with the present invention, which shows the formation of a first pole piece layer;

FIG. 13 is an illustration of that shown in FIG. 12 except that a pedestal has been electrically plated over a central portion of the first pole piece layer;

DETAILED DESCRIPTION OF THE PREFERRED EMBODIMENTS

Methods of making magnetic write heads using electron beam (E-beam) lithography are described herein. In one illustrative method, a pedestal is formed over a first pole piece layer and insulator materials are formed to surround it. A gap layer made of a non-magnetic insulator or metal is then formed over the pedestal and the insulator, followed by the optional formation of a seed layer. A second pole piece is formed over the gap layer (and the optional seed layer if provided) by forming a patterned resist using E-beam lithography and electroplating second pole piece materials within the patterned resist. Using the E-beam lithography, the second pole piece is centered with precision over the pedestal. After milling to remove side portions of the gap layer (and the optional seed layer if provided), a chemical etch is performed to remove at least top portions of the insulator materials which surround the pedestal. This chemical etch consumes little if any gap layer or pedestal materials. The pedestal is then notched and trimmed by ion milling using the second pole piece as a mask to form a central notched structure having side walls with angled slopes. The central notched structure results in improved writing performance of the magnetic write head. Since the second pole piece is precisely centered over the pedestal prior to the notching, the pedestal is notched substantially symmetrically. If the width of the pedestal minus the width of the second pole piece is small, consumption of the second pole piece due to the ion milling can be minimized.

The following description is the best embodiment presently contemplated for carrying out the present invention. This description is made for the purpose of illustrating the general principles of the present invention and is not meant to limit the inventive concepts claimed herein.

Figure 1:
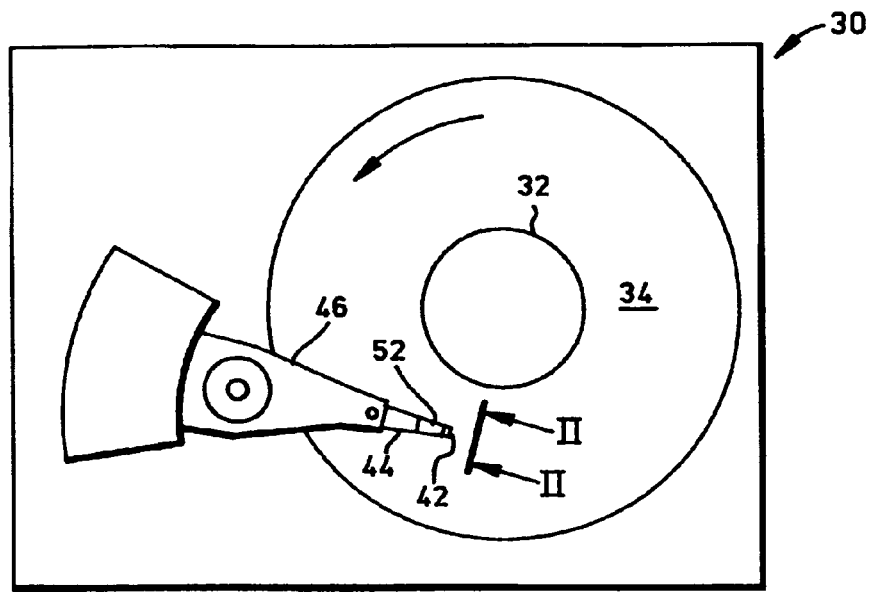
FIG. 1 is a planar view of an exemplary magnetic disk drive.
Figure 2:
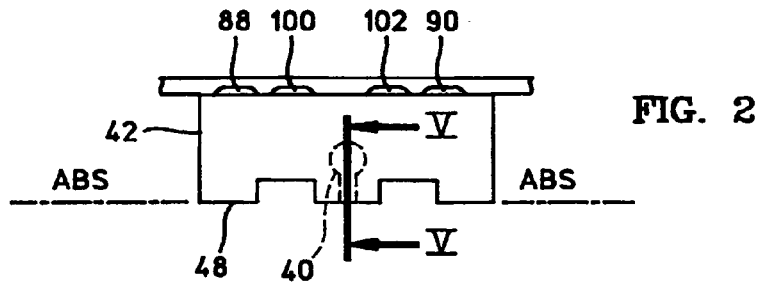
FIG. 2 is an end view of a slider with a magnetic head of the disk drive as seen in plane II—II.
Figure 3:
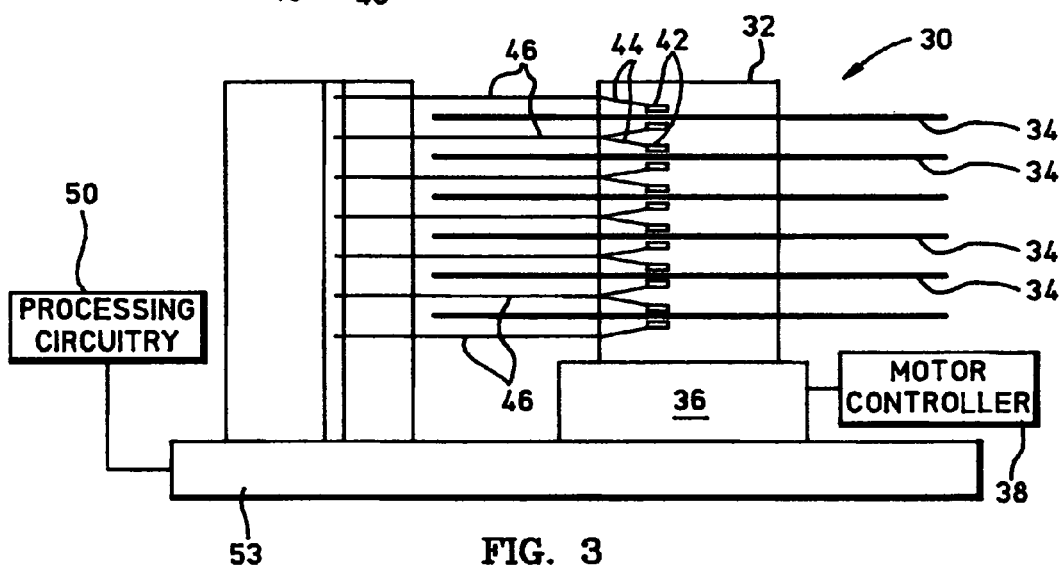
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, the slider is supported on a thin (typically, 0.05 μm) cushion of air (air bearing) between the disk and an air bearing surface (ABS) 48.

Figure 4:
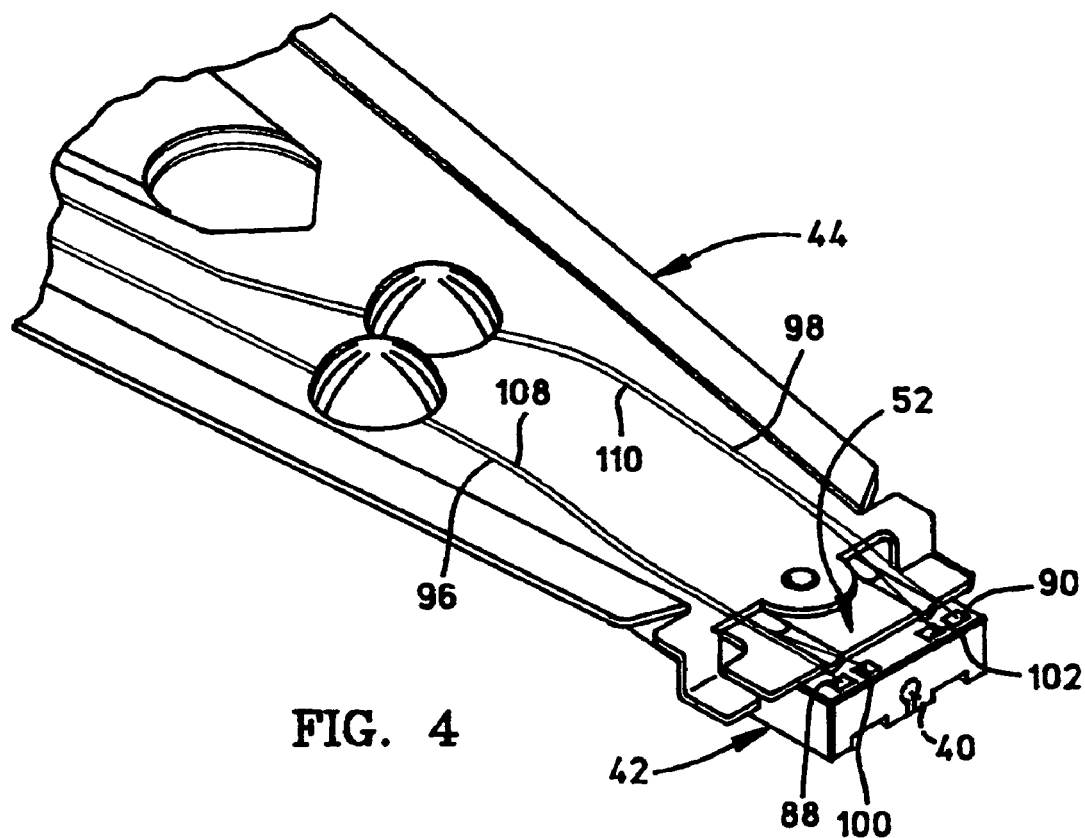
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to the suspension 44. All of the above components are supported on a base 53.

FIG. 5 is a side cross-sectional elevation view of a merged magnetoresistive (MR) head 40, with a write head portion 54 and a read head portion 56. Read head portion 56 includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through the sensor causes these resistance changes to be manifested as potential changes, which are processed by processing circuitry 50 shown in FIG. 3.

Figure 6:
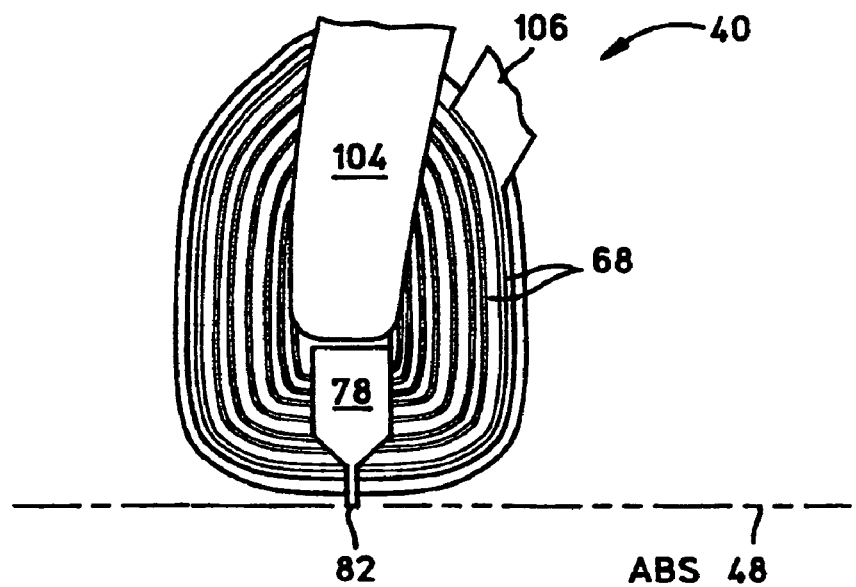
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. A third insulation layer 74 may be employed for planarizing the head to eliminate ripples in the second insulation layer caused by the coil layer 68. First, second and third insulation layers are referred to as an "insulation stack". Coil layer 68, and first, second and third insulation layers 70, 72 and 74, are sandwiched between first and second pole piece layers 76 and 78. First and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from coil 68 (see FIG. 6) to leads 108 and 110 on suspension 44.

Figure 8:
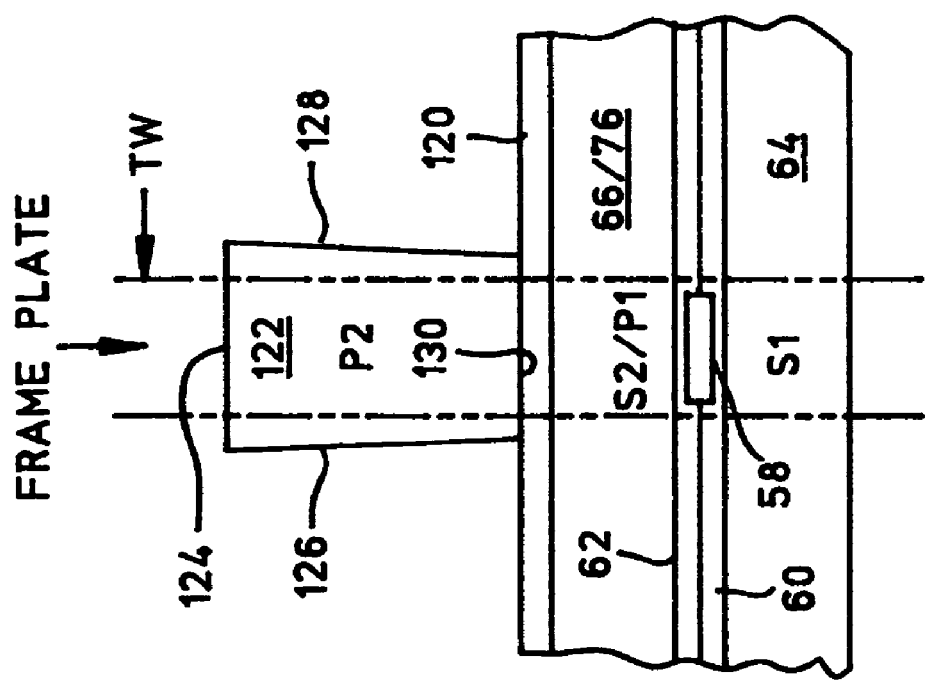
FIG. 8 is an ABS of a prior art head prior to notching the first pole piece.

FIG. 8 shows an ABS view of a prior art merged magnetic head, in which the second shield of the read head and the first pole piece of the write head are a common layer 66/76. Gap layer 120 has been formed on first pole piece layer 66/76, followed by frame plating a second pole tip 122 on gap layer 120. Second pole tip 122 is a front portion of the second pole piece. The second pole tip is bounded by a top 124, first and second side walls 126 and 128, and a base 130. The target track width (TW) is shown in FIG. 8. Since the first pole piece will be notched by ion milling, second pole tip 122 is larger than a target size track width (TW) of the second pole tip, so as to allow for consumption of the second pole tip during a subsequent milling cycle. Accordingly, before milling, first and second side walls 126 and 128 extend beyond the track width, and top 124 is higher than the target height. The dimensions of these sacrificial portions is referred to in the art as windage.

Figure 9:
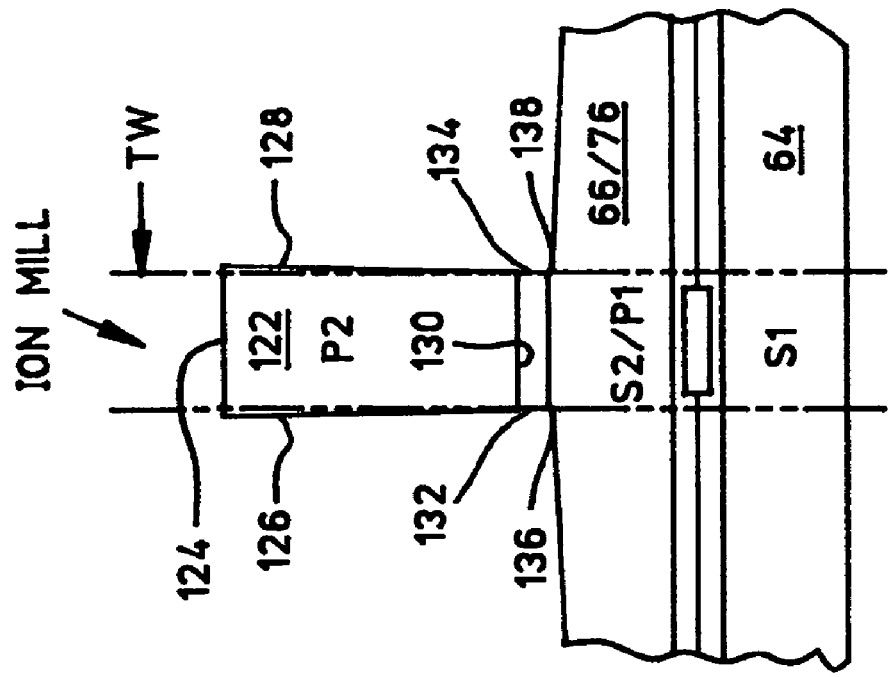
FIG. 9 is an ABS view of the prior art head of FIG. 8 after the first pole piece is formed with notches by milling.

In FIG. 9 ion milling is employed to mill through the gap layer to form a write gap 130 with first and second side walls 132 and 134, and to mill notches into the first pole piece 66/76 with first and second side walls 136 and 138. After milling, first side walls 126, 132 and 136 are contiguous, and second side walls 128, 134 and 138 are contiguous. This notching improves the transfer of flux between second pole tip 122 and first pole piece 66/76, since the flux will transfer to the pedestal portion of the first pole piece instead of the larger expanse thereof This reduces side writing by the write head. The milling is at an angle to a normal to layers 66/76 and 64 in order to minimize redeposition of the milled material. It should be understood that the partially completed magnetic head in FIG. 9 rests upon a substrate (not shown) that is rotated during the milling cycle. The second pole tip is employed as a mask for forming write gap 130 and notching first pole piece at 136 and 138. It can be seen that this causes shadowing at notching sites 136 and 138 during approximately 180 degrees of the rotation, due to the angle of the milling. This shadowing increases the processing time required to form the notches in the first pole piece. It should be noted that the downward sloping portions of first pole piece layer 62 in FIG. 9 are formed due to the shadowing by second pole tip 122.

After milling, second pole tip 122 has been reduced in size. With the prior art method it is very difficult to reduce second pole tip 122 to the target track width and the target height because of the significant time required for milling the large lateral expanse of first pole tip 66/76. Milling of flat surfaces is very time-consuming as compared to side walls. Further, top 124 in FIG. 8 requires extra height because of the long time required for milling. This extra height increases the aspect ratio (ratio between height of resist employed to frame plate the second pole tip 122 and the target track width), which reduces the line width control capability of the second pole tip. Prior art methods of notching the first pole piece discussed in commonly assigned U.S. Pat. Nos. 5,438,747 and 5,452,164 indicate a strong-felt need to achieve self-aligned pole tips and to reduce the time required for notching.

Figure 10:
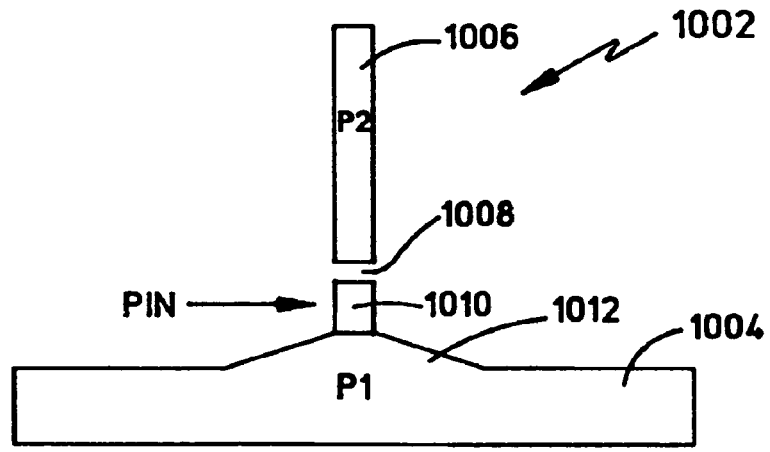
FIG. 10 is an ABS view of another prior art head formed with notches.
Figure 11:
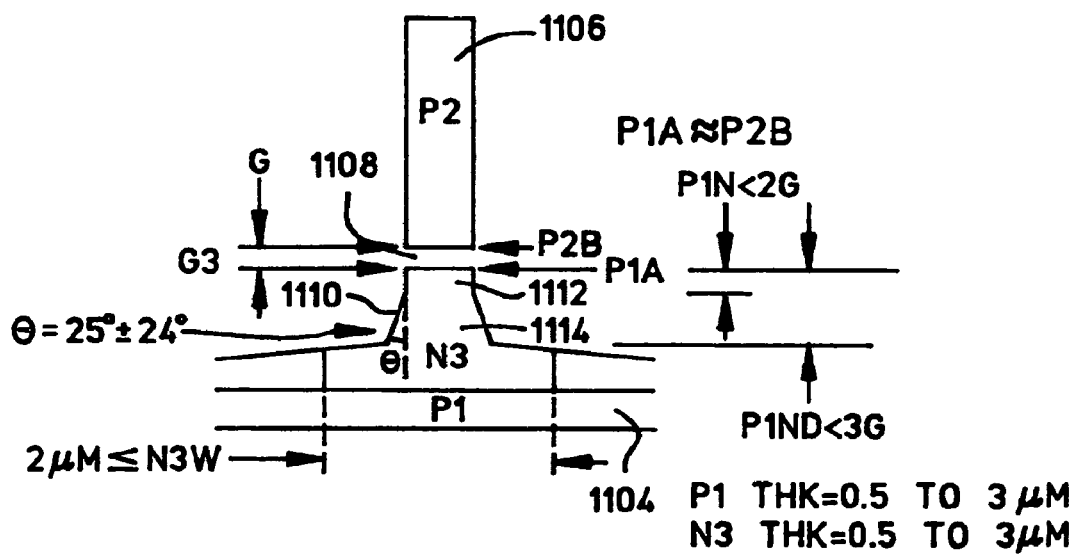
FIG. 11 is an ABS view of yet another prior art head formed with notches.

FIG. 10 shows another conventional magnetic head 1002 which has a first pole piece 1004 and a second pole piece 1006 separated by a gap 1008. Between first pole piece 1004 and gap 1008 is a notched structure 1010, which resides on a raised and angled surface 1012 of first pole piece 1004. The surface 1012 is raised and angled due to the ion milling process to form the notches. Note that notched structure 1010 itself has "straight" side walls (i.e. side walls that are zero degrees relative to normal). FIG. 11 is another conventional magnetic head 1102 having a notched pole piece structure which is described in U.S. patent Publication No. US 2003/0179498 A1 entitled "Magnetic Head Having A Notched Pole Piece Structure And Method Of Making The Same" by Inventors Hsiao et al. Magnetic head 1102 includes a first pole piece 1104 ("P1") and a second pole piece 1106 ("P2") separated by a gap 1108. Between first pole piece 1104 and gap 1108 is a central notched structure 1110 having angled side walls. By "angled," it is meant that the side walls slope outwardly at an angle greater than zero degrees (relative to normal). The angle at which the side walls slope is preferably 25 degrees, ±24 degrees. In decreasing order of generality, the angle may be 25 degrees±24 degrees; or 25 degrees±20 degrees; or 20 degrees±18 degrees; or 20 degrees±10 degrees; or between about 5–50 degrees. It has been observed that such angled side walls provide for an improved fringing field and overwrite capability as compared to the straight side walls of notched structure 1010 of FIG. 10. In this example, notched structure 1110 actually is formed of a top straight-walled portion 1112 having "straight" walls as well as a bottom angled-wall portion 1114 having the angled side walls. Below the bottom angled-wall portion 1114, bottom surfaces of notched structure 1110 have small outward downward slopes.

An improved method of making such a magnetic head will now be described in relation to FIGS. 12–21. Beginning with FIG. 12, a first pole piece 1202 ("P1") is formed by frame plating. First pole piece 1202 is made of a magnetic material, preferably one with a high magnetic moment, such as nickel-iron (NiFe), cobalt-iron (CoFe), or cobalt-iron-nitride (CoFeN). Next, in FIG. 13, a pedestal 1302 ("N3") is frame plated over a central portion of first pole piece 1202. Plated pedestal 1302 is made of a magnetic material, preferably one with a high magnetic moment, such as NiFe, CoFe, or CoFeN. Preferably, plated pedestal 1302 is plated to a thickness between about 0.3–3.0 μm, and preferably to a thickness of about 2 μm. The width of plated pedestal 1302 is preferably greater than 1 μm.

Figure 14:
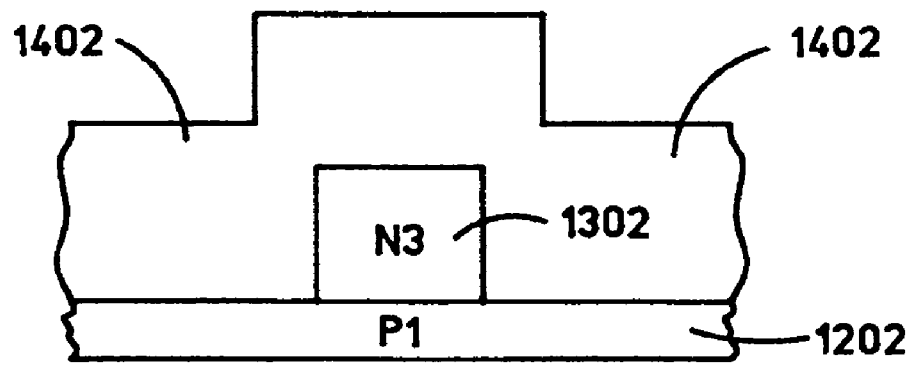
FIG. 14 is an illustration of that shown in FIG. 13 except that an insulator (e.g., alumina) has been deposited over the tops of the first pole piece layer and the plated pedestal.
Figure 15:
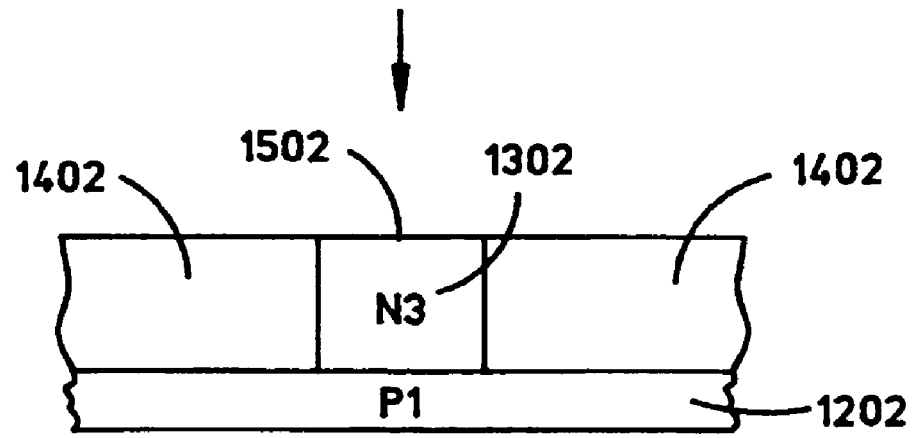
FIG. 15 is an illustration of that shown in FIG. 14 except that chemical mechanical polishing (CMP) has been performed over the top of the insulator to expose a top of the plated pedestal.

In FIG. 14, an insulator 1402 such as alumina ($Al_2O_3$) or other suitable material is then deposited over first pole piece 1202 and plated pedestal 1302. Preferably, in this embodiment insulator 1402 is deposited to a thickness that is about twice the thickness of plated pedestal 1302. Next in FIG. 15, a planarization process such as a chemical mechanical polishing (CMP) is performed to expose a top 1502 of plated pedestal 1302 such that the top surfaces of both insulator 1402 and plated pedestal 1302 are flush, flat, and smooth.

Figure 16:
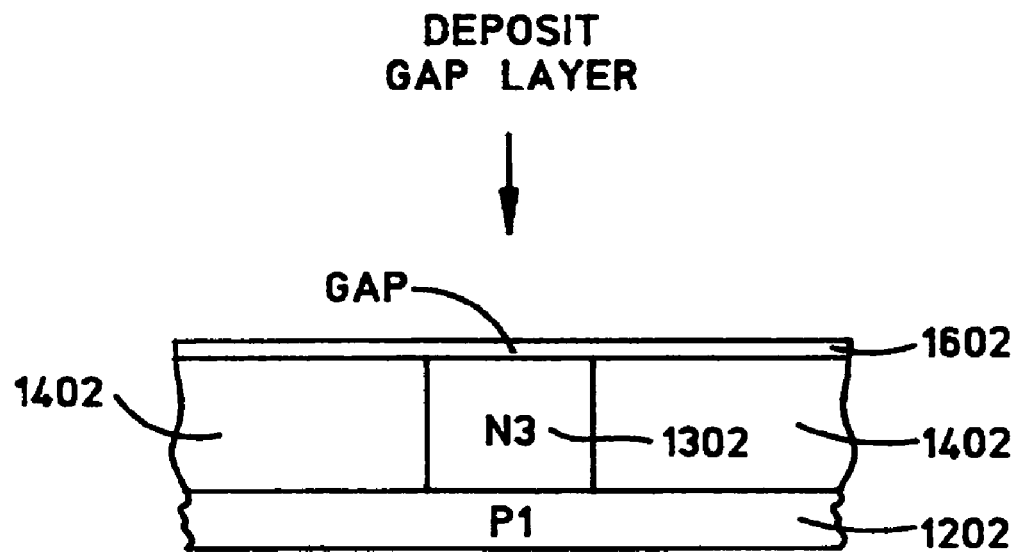
FIG. 16 is an illustration of that shown in FIG. 15 except that a gap layer made of a non-magnetic metal has been deposited over the top of plated pedestal and the insulator.

In FIG. 16, a gap layer 1602 ("gap") is then deposited over the flat top surface of insulator 1402 and plated pedestal 1302. Gap layer 1602 may be made of silicon-dioxide ($SiO_2$), silicon-nitride ($Si_3N_4$), silicon-carbide (SiC), or other suitable dielectric or non-magnetic metals. The thickness of gap layer 1602 may vary from between about 500 and 2000 Angstroms. Preferably, gap layer 1602 is made of a non-magnetic metal. Examples of gap layer 1602 of the non-magnetic metal type include rhodium (Rh), tantalum/rhodium (Ta/Rh), chromium (Cr), gold (Gd), and alloys thereof. The thickness of gap layer 1602 of the non-magnetic metal type varies between about 500–2000 Angstroms, and in the present example it has a thickness of about 1000 Angstroms if tantalum/rhodium (Ta/Rh) is used. Note that gap layer 1602 may serve as the seed layer for the subsequent electroplating of the second pole piece. In this case, a separate seed layer as discussed below in relation to FIG. 17 is not necessary.

Figure 17:
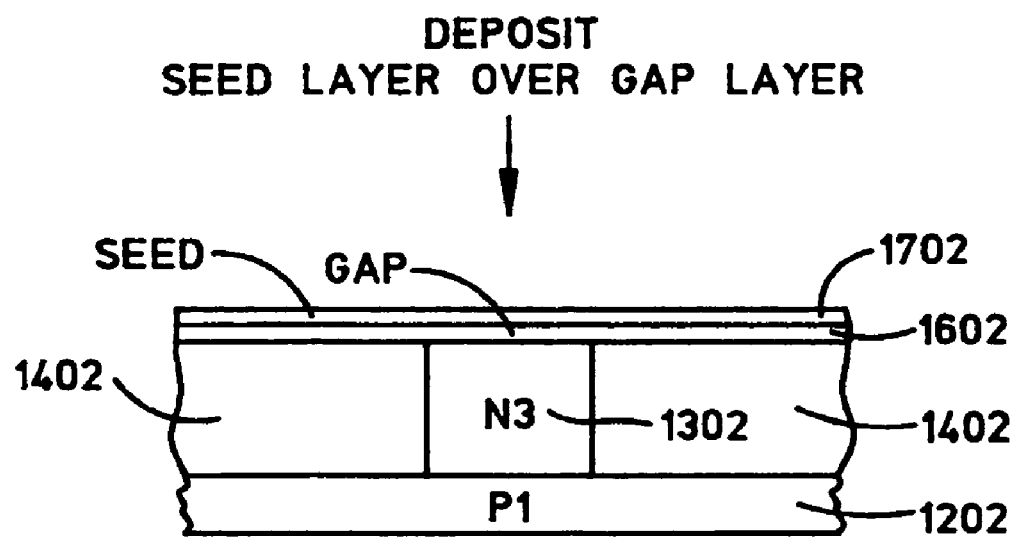
FIG. 17 is an illustration of that shown in FIG. 16 except that a seed layer has been deposited over the gap layer.

In FIG. 17, a separate optional seed layer 1702 ("seed") is deposited over gap layer 1602. Seed layer 1702 is made of a magnetic material, preferably one with a high magnetic moment such as nickel-iron (NiFe), cobalt-iron (CoFe), or cobalt-iron-nitride (CoFeN). Preferably, seed layer 1702 has a magnetic moment that is higher than that of a second pole piece which is subsequently formed over it. The thickness of seed layer 1702 preferably varies between about 400 and 4000 Angstroms and, in the present example, seed layer 1702 has a thickness of about 1600 Angstroms. A thin adhesion layer of tantalum (Ta) or other suitable material (not shown in FIG. 17) may be formed below the gap/seed layer(s) for improved adhering of layers.

Figure 18:
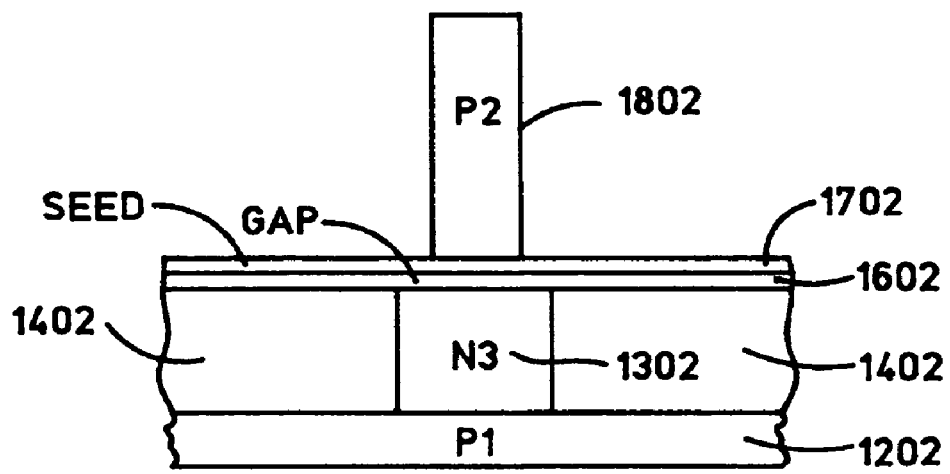
FIG. 18 is an illustration of that shown in FIG. 17 except that a second pole piece has been plated and formed over the seed layer using electron-beam (E-beam) lithography for precise alignment.
Figure 19:
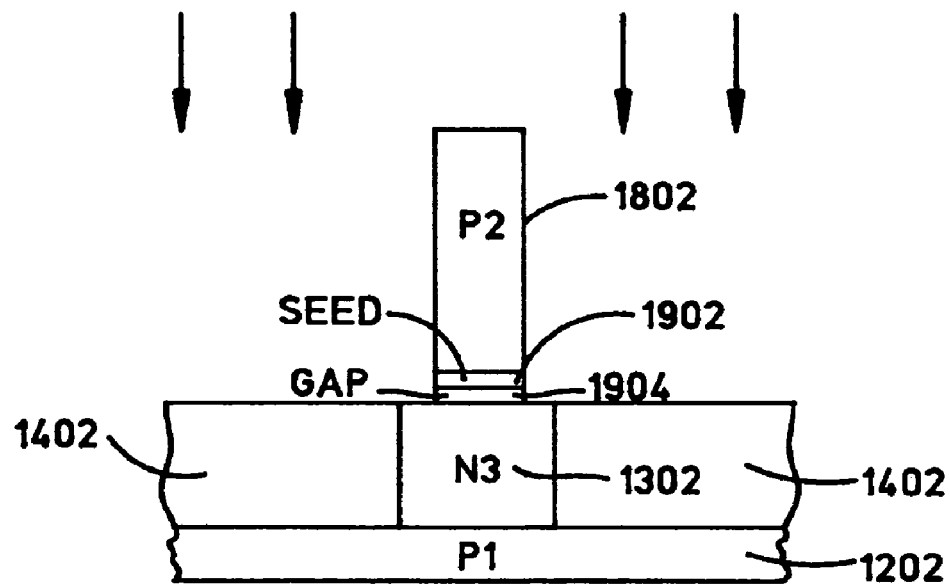
FIG. 19 is an illustration of that shown in FIG. 18 except that ion milling has been performed using the second pole piece as a mask to remove side portions of the seed and gap layers.

Once gap layer 1602 and the optional seed layer 1702 are deposited, a second pole piece 1802 ("P2") is formed over the structure as shown in FIG. 18. As with first pole piece 1202, plated pedestal 1302, and seed layer 1702, second pole piece 1802 is made of a magnetic material, preferably one with a high magnetic moment such as nickel-iron (NiFe), cobalt-iron (CoFe), or cobalt-iron-nitride (CoFeN). Note that second pole piece 1802 is made by electroplating such magnetic materials within a patterned resist formed with use of electron beam (E-beam) lithography. Using E-beam lithography, second pole piece 1802 is centered with precision over plated pedestal 1302. This greatly improves a subsequent notching process described later below. Second pole piece 1802 is made in particular by forming a resist over the gap/seed layer, patterning the resist by exposing a portion of the resist to an electron beam, etching to remove the exposed portion of the resist, electroplating second pole piece materials within the patterned resist, and removing the patterned resist with a suitable solvent. The width of second pole piece 1802 may be formed to anywhere between about 0.2–0.5 microns, such as about 0.3 microns, but will be reduced in size in the subsequent ion milling process for notching pedestal 1302.

If the separate seed layer 1702 exists, side portions of seed layer 1702 are then ion milled using second pole piece 1802 as a milling mask to leave a remaining central portion of seed layer 1902 (see FIG. 19) underneath second pole piece 1802. Given the dimensions of the present example, it may take about 3 to 10 minutes of ion milling time to form seed layer portion 1902. Side portions of the gap layer are also ion milled where seed layer portion 1902 is used as a milling mask, to leave a remaining central portion of gap layer 1904 (see FIG. 19). Given the dimensions of the present example, it takes less than 10 minutes of ion milling time to form gap layer portion 1904. The specific time depends on the initial gap thickness, which in this case is between about 0.05–0.2 μm. Note that no reactive ion milling is necessary to remove non-magnetic metal gap layer materials.

Figure 20:
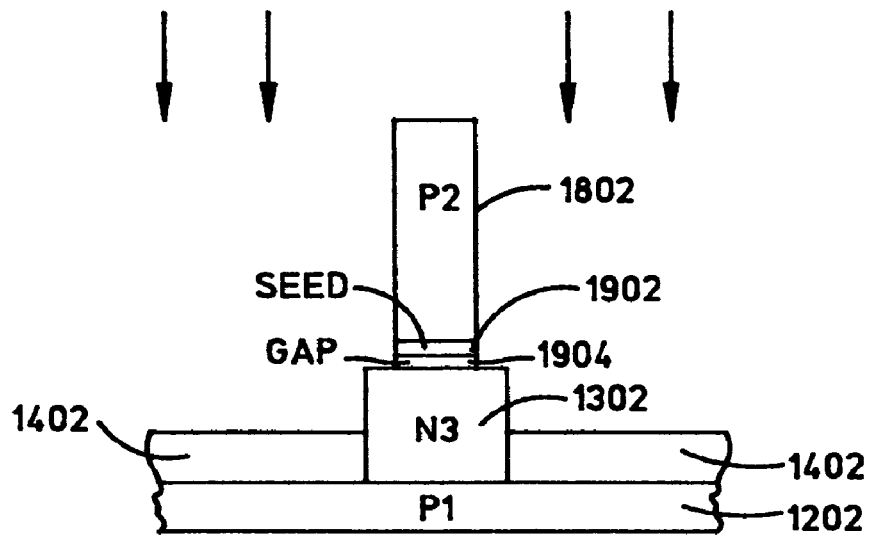
FIG. 20 is an illustration of that shown in FIG. 19 except that a chemical etch is performed to remove a top portions of the insulator.

In FIG. 20, a chemical etch is then performed to remove at least top portions of insulator 1402. The chemical etch may use any suitable wet etchant, such as sodium hydroxide (NaOH) with ethylenediamine tetraacetate (EDTA). The chemical etch may remove top portions of insulator 1402 from anywhere between about 3000–4000 Angstroms, or remove all of insulator 1402. Note that the chemical etch removes little if any materials of gap layer portion 1904 when it is made from the non-magnetic metal and pedestal 1302.

Figure 21:
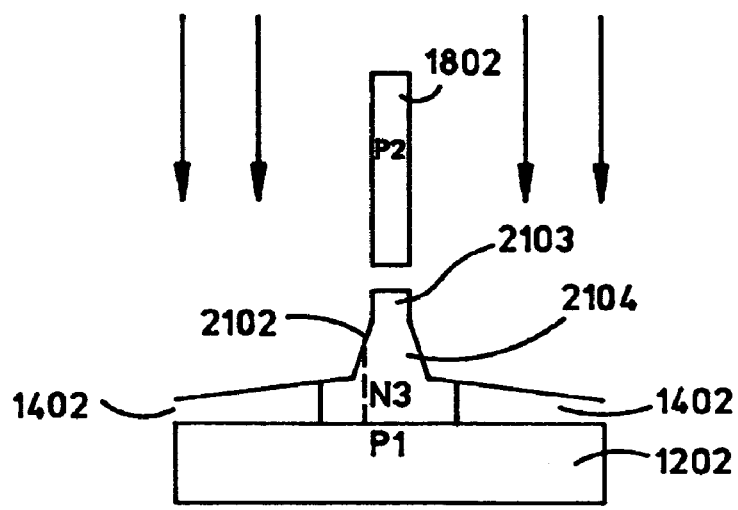
FIG. 21 is an illustration of that shown in FIG. 20 except that ion milling on the plated pedestal has been performed, using the second pole piece as a mask, to form a self-aligned structure having angled side walls.

After the chemical etch of FIG. 20, pedestal 1302 is notched by an ion milling process using second pole piece 1802 as a milling mask in FIG. 21. With a notching and trimming process, second pole piece 1802 gradually shrinks in size during the ion milling, plated pedestal 1302 is formed into a notched structure 2102 as shown. In this embodiment, notched structure 2102 has a straight-walled portion 2103 and an angled-wall portion 2104 formed below straight-walled portion 2103. Preferably, the angle of each side wall of angled-wall portion 2104 is about 25 degrees±24 degrees relative to normal. More preferably, each side wall is angled at least 5 degrees relative to normal within these bounds. The resultant width for second pole piece 1802 (which helps define the trackwidth) after such ion milling may be between about 0.05–0.2 micrometers.

Figure 28:
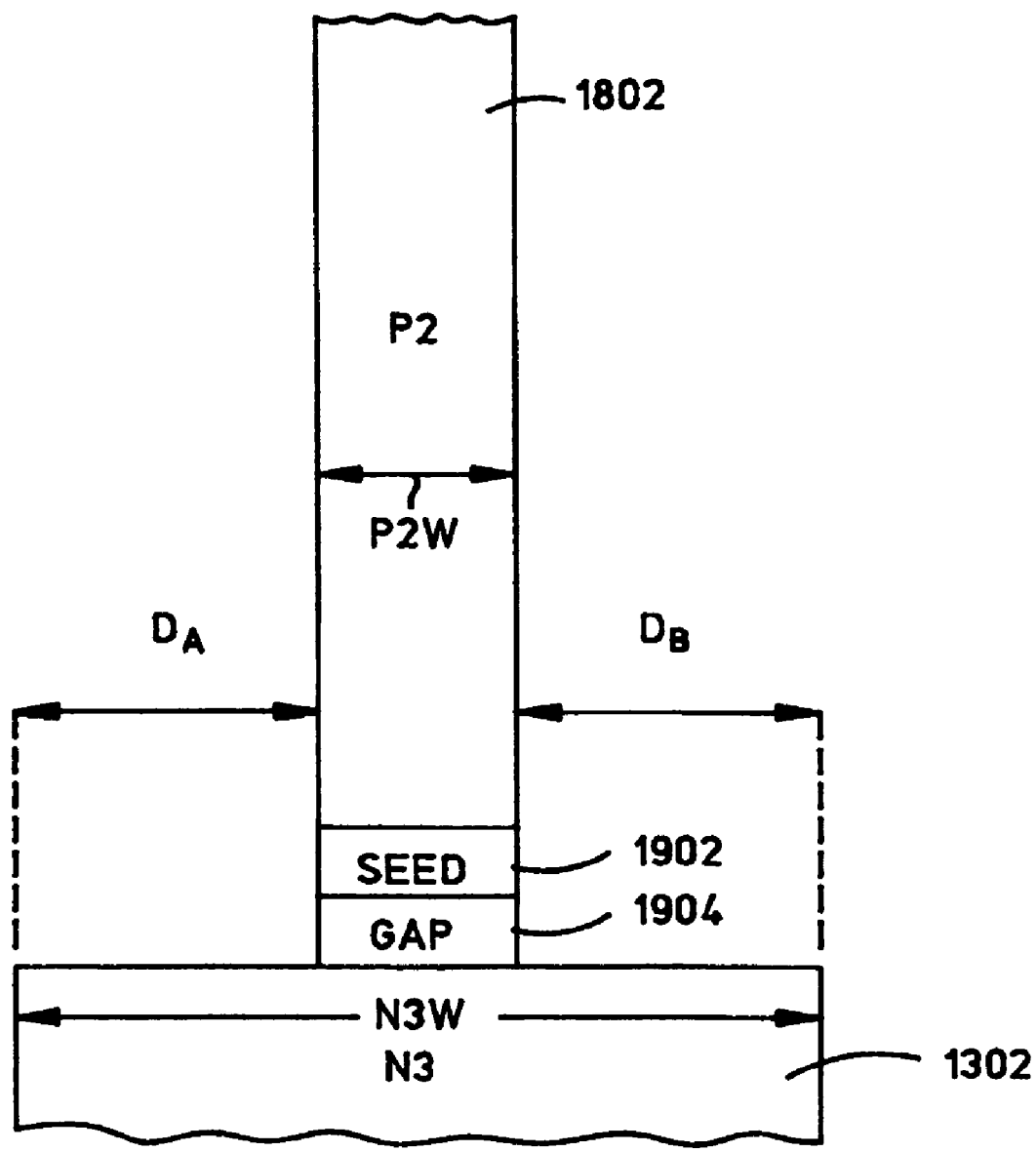
FIG. 28 is a close-up view of the second pole piece being centered with precision relative to the underlying pedestal.

Since the second pole piece is precisely centered over the pedestal using E-beam lithography prior to the notching, the pedestal is notched substantially symmetrically. A precise centering of the second pole piece is depicted in more detail in FIG. 28. In FIG. 28, it is shown that the leftmost edge of second pole piece 1802 and the leftmost edge of pedestal 1302 are separated by a distance $D_A$, and the rightmost edge of second pole piece 1802 and the rightmost edge of pedestal 1302 are separated by a distance $D_B$. Due to the precise centering of second pole piece 1802 using E-beam lithography, $D_A+D_B \leq 0.3$ microns and $|D_A-D_B| \leq 0.2$ microns. When the notched pedestal is appropriately formed and is substantially symmetric, the magnetic head has suitable overwrite (OW) properties and shows little if any adjacent track interference (ATI) problems. By using E-beam lithography, the width of pedestal 1302 ("N3W" in FIG. 28) minus the width of second pole piece 1802 ("P2W" in FIG. 28) can be as small as 0.2 microns. If N3W–P2W≦1 micron, then a steep notched structure can be achieved with much less consumption of second pole piece 1802 (i.e. its P2W). A magnetic head having a thicker resulting second pole piece 1802 has better OW performance.

Note that plated pedestal 1302 may also be electroplated within a patterned resist formed with use of E-beam lithography. If this is the case, plated pedestal 1302 is made by forming a resist over the first pole piece layer, patterning the resist by exposing portions of the resist to an electron beam, etching to remove the exposed portions of the resist, electroplating pedestal materials within the patterned resist, and removing the patterned resist with a suitable solvent.

Figure 22:
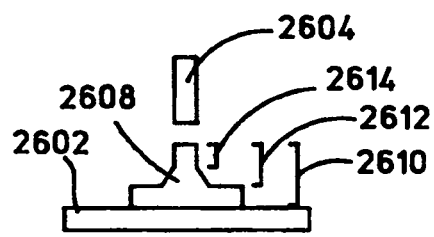
FIGS. 22–25 are other examples of a notched structure having angled side walls.

In general, the notched structure of the pedestal may take on a variety of shapes and dimensions, as shown and described in relation to FIGS. 22–25. FIG. 22 shows a notched structure 2608 formed on a first pole piece 2602 which is adjacent a second pole piece 2604. As shown, notched structure 2608 has a bottom straight-walled structure, a middle angled-wall portion, and a top straight-walled portion. The angle of each angled side wall of the angled-wall portion is preferably 25 degrees±24 degrees. Notched structure 2608 has a total height 2610 of 0.1–0.5 µm, where the middle angled-wall and top straight-walled portions have a combined height 2612 of 0.3 µm and the top straight-walled portion alone has a height 2614 of less than 0.1 µm. The thickness of the gap is about 0.12 µm. The bottom straight-walled portion has a width that is much greater than the width of the angled-wall portion (e.g., 4 µm+the width of second pole piece 2604). The bottom straight-walled portion may alternatively have ends that extend all the way over the ends of first pole piece 2602. The top straight-walled portion has a width that is substantially the same as the width of second pole piece 2604.

Figure 23:
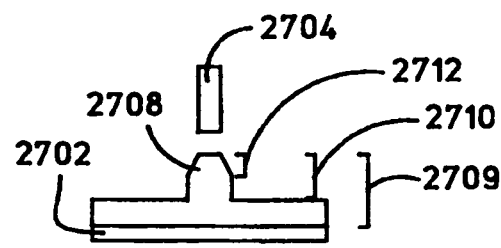

As another example, FIG. 23 shows a notched structure 2708 formed on a first pole piece 2702 which is adjacent a second pole piece 2704. As shown, notched structure 2708 has a bottom portion, a middle straight-walled portion, and a top angled-wall portion. No straight-walled portion above the top angled-wall portion is formed. The angle of each angled side wall of the top angled-wall portion is 25 degrees±24 degrees. Notched structure 2708 has a total height 2709 of 1–5 µm; the middle straight-walled portion and the top angled-wall portion have a combined height 2710 of 0.24 µm; and the top angled-wall portion alone has a height of 0.1–0.5 µm. The thickness of the gap is about 0.12 µm. The middle straight-walled portion has a width that is equal to the width of the bottom of the angled-wall portion, and the bottom portion has ends that extend over the ends of second pole piece 2702.

Figure 24:
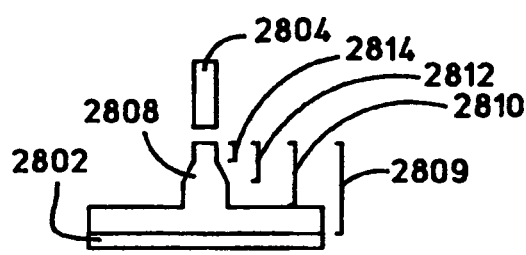

In yet even another example, FIG. 24 shows a notched structure 2808 formed on a first pole piece 2802 which is adjacent a second pole piece 2804. As shown, notched structure 2808 has a bottom portion, middle straight-walled portion, a middle angled-wall portion, and a top straight-walled portion. The angle of each angled side wall of the middle angled-wall portion is 25 degrees±24 degrees. Notched structure 2808 has a total height 2809 of 1–5 µm, where the middle and top portions have a combined height 2810 of 0.24 µm, the middle angled-wall portion and top straight-walled portion have a combined height 2812 of 0.1–0.5 µm and the top straight-walled portion alone has a height 2814 of 0–0.4 µm. The thickness of the gap is about 0.12 µm. The middle straight-walled portion has a width that is equal to the width of the bottom of the middle angled-wall portion. The top straight-walled portion has a width that is substantially the same as the width of second pole piece 2804.

Figure 25:
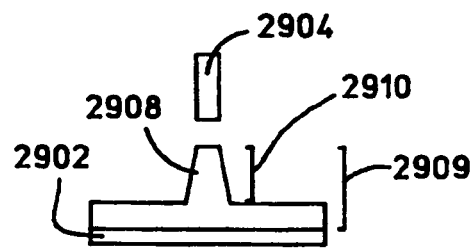

As a final example of this type, FIG. 25 shows a notched structure 2908 formed on a first pole piece 2902 which is adjacent a second pole piece 2904. As shown, notched structure 2908 has a bottom portion and a top angled-walled portion. The angle of each angled side wall of the top angled-wall portion is preferably 25 degrees±24 degrees. Notched structure 2908 has a total height 2909 of 1–5 µm, where the top angled-wall portion alone has a height 2910 of about 1.5 µm. The thickness of the gap is about 0.16 µm. The top of the top angled-wall portion has a width that is substantially the same as the width of second pole piece 2904.

Figure 26:
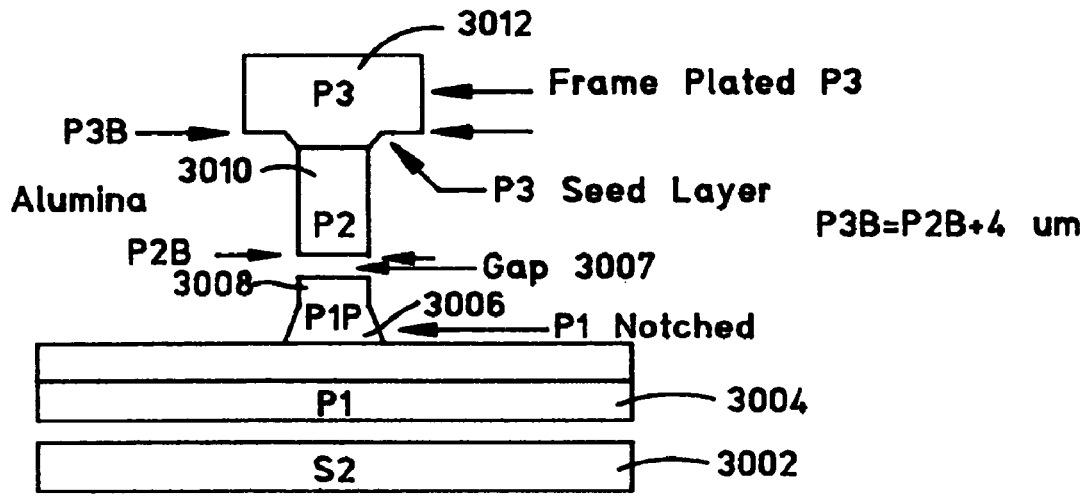
FIGS. 26–27 are further examples of notched structures having angled side walls.
Figure 27:
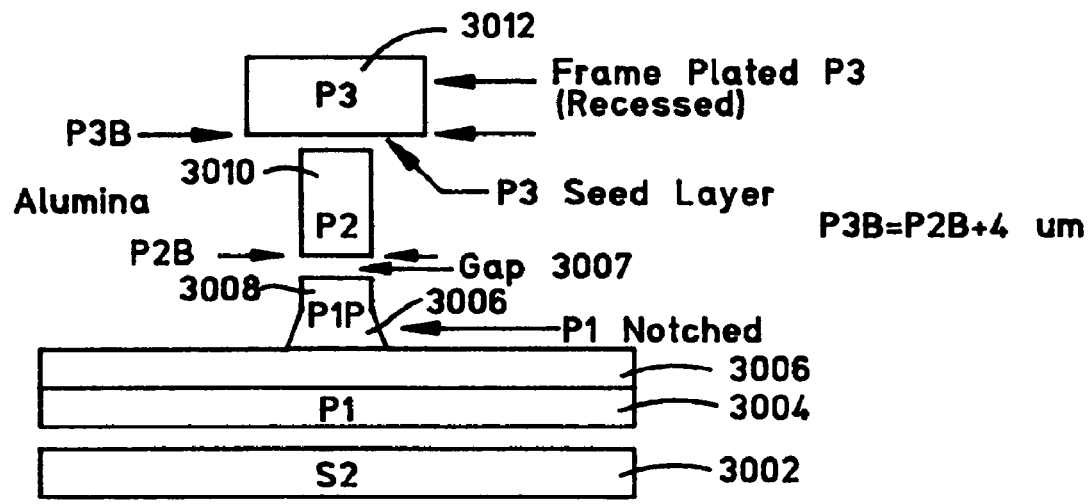

FIGS. 26–27 show another write head with a notched structure in an alternate embodiment. A first pole piece 3004 is formed over a shield 3002 and an notched structure 3006 having an angled-walled portion 3008 is formed over first pole piece 3004. A second pole piece 3010 is separated from notched structure 3006 by a gap 3007 and is adjacent a third pole piece 3012. Third pole piece 3012, which is frame plated over second pole piece 3010, also has an angled notched structure and is separated from second pole piece 3010 by a high magnetic moment seed layer. The magnetic head in FIG. 27 is the same as that in FIG. 26 except that it is recessed from second pole piece 3010.

Methods of making magnetic write heads using electron beam lithography have been described. In one illustrative method, a pedestal is formed over a first pole piece layer and insulator materials are formed to surround it. A gap layer made of a non-magnetic insulator or metal is then formed over the pedestal and the insulator, followed by the optional formation of a seed layer. A second pole piece is formed over the gap layer (and the optional seed layer if provided) by forming a patterned resist using E-beam lithography and electroplating second pole piece materials within the patterned resist. Using the E-beam lithography, the second pole piece is centered with precision over the pedestal. After milling to remove side portions of the gap layer (and the seed layer if provided), a chemical etch is performed to remove at least top portions of the insulator materials which surround the pedestal. This chemical etch consumes little if any gap layer or pedestal materials. The pedestal is then "notched" and trimmed by ion milling using the second pole piece as a mask to form a central notched structure having side walls with angled slopes. The central notched structure having both straight and angled walled portions provides an improved writing performance of the magnetic write head. Since the second pole piece can be precisely centered over the pedestal prior to the notching, the pedestal is notched substantially symmetrically. If the width of the pedestal minus the width of the second pole piece is small, then a steep notched structure can be achieved with much less consumption of the second pole piece.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special particular meaning different from their plain language meaning, and therefore the specification is not to be used to define terms in an unduly narrow sense.

What is claimed is:

1. A method of making a magnetic head, comprising the acts of:
    forming a pedestal over a first pole piece layer;
    forming insulator materials to surround the pedestal;
    depositing a gap layer over the pedestal and the insulator materials;
    forming a second pole piece over the gap layer by:
        forming a patterned resist for the second pole piece by exposing a portion of a resist to an electron beam and etching to remove the exposed portion;
        electroplating second pole piece materials within the patterned resist;
    etching the gap layer such that side portions of the gap layer are removed and a central portion remains between the second pole piece and the pedestal;
    etching to remove at least top portions of the insulator materials which surround the pedestal; and
    milling the pedestal, using the second pole piece as a mask, to form a central notched structure having side walls with angled slopes.

2. The method of claim 1, wherein the act of forming the second pole piece comprises electron beam (E-beam) lithography.

3. The method of claim 1, wherein the gap layer comprises a non-magnetic insulator.

4. The method of claim 1, wherein the gap layer comprises a non-magnetic metal.

5. The method of claim 1, wherein the gap layer comprises a non-magnetic metal selected from the group consisting of rhodium, tantalum/rhodium, chromium, and gold.

6. The method of claim 1, wherein the act of etching to remove the top portions of the insulator materials comprises performing a chemical etch.

7. The method of claim 1, wherein the gap layer comprises a non-magnetic metal and the act of etching to remove the top portions of the insulator materials comprises performing a chemical etch.

8. The method of claim 1, wherein the gap layer comprises a non-magnetic metal and the act of etching to remove the top portions of the insulator materials comprises performing a chemical etch which removes little if any of the gap layer.

9. The method of claim 1, further comprising:
    forming a seed layer over the gap layer.

10. The method of claim 1, further comprising:
    forming a seed layer over the gap layer; and
    wherein the seed layer has a magnetic moment greater than or equal to that of the second pole piece.

11. The method of claim 1, further comprising:
    forming a seed layer over the gap layer; and
    etching the seed layer such that side portions of the seed layer are removed and a central portion remains between the second pole piece and the gap layer.

12. The method of claim 1, wherein the pedestal is centered with respect to the pedestal.

13. The method of claim 1, wherein the act of forming the pedestal comprises:
    forming a patterned resist for the pedestal by exposing a portion of a resist to an electron beam and etching to remove the exposed portion; and
    electroplating pedestal materials within the patterned resist.

14. A method of making a magnetic head, comprising:
    electroplating a pedestal over a first pole piece layer;
    forming insulator materials to surround the electroplated pedestal;
    depositing a gap layer over the electroplated pedestal and the insulator materials, the gap layer comprising a non-magnetic metal;
    forming a second pole piece over the gap layer by:
        forming a patterned resist for the second pole piece by exposing a portion of a resist to an electron beam and etching to remove the exposed portion;
        electroplating second pole piece materials within the patterned resist;
    etching the gap layer such that side portions of the gap layer are removed and a central portion remains between the second pole piece and the electroplated pedestal;
    performing a chemical etch to remove at least top portions of the insulator; and
    milling the electroplated pedestal, using the second pole piece as a mask, to form a central notched structure having side walls with angled slopes.

15. The method of claim 14, wherein the act of forming the second pole piece comprises electron beam (E-beam) lithography so that a precise centering between the second pole piece and the electroplated pedestal is achieved.

16. The method of claim 14, wherein the gap layer comprises a non-magnetic metal selected from the group consisting of rhodium, tantalum/rhodium, chromium, and gold.

17. The method of claim 14, wherein the act of performing the chemical etch removes little if any of the gap layer.

18. The method of claim 14, wherein the act of forming the patterned resist with use of the electron beam lithography comprises exposing a portion of a resist to an electron beam and etching to remove the exposed portion of the resist.

19. The method of claim 14, further comprising:
    forming a seed layer over the gap layer.

20. The method of claim 14, further comprising:
    forming a seed layer over the gap layer; and
    etching the seed layer such that side portions of the seed layer are removed and a central portion remains between the second pole piece and the gap layer.

21. The method of claim 14, wherein the second pole piece is centered with respect to the electroplated pedestal.

22. A method of making a magnetic head comprising the acts of:
- forming a pedestal over a first pole piece layer;
- forming insulator materials to surround the pedestal, and performing a chemical-mechanical polishing (CMP) to form the same;
- forming a gap layer over the pedestal and the insulator materials;
- depositing a seed layer over the gap layer;
- forming a second pole piece over the seed layer by:
  - forming a patterned resist for the second pole piece by exposing a portion of a resist to an electron beam and etching to remove the exposed portion;
  - electroplating second pole piece materials within the patterned resist;
- etching the seed layer such that side portions of the seed layer are removed and a central portion remains between the gap layer and the second pole piece;
- etching the gap layer such that side portions of the gap layer are removed and a central portion remains between the seed layer and the pedestal;
- performing a chemical etch to remove at least top portions of the insulator; and
- ion milling the pedestal, using the second pole piece as a mask, to form a central notched structure having side walls with angled slopes.

23. The method of claim 22, wherein the gap layer comprises a non-magnetic insulator.

24. The method of claim 22, wherein the gap layer comprises a non-magnetic metal.

25. The method of claim 22, wherein the gap layer comprises a non-magnetic metal selected from the group consisting of rhodium, tantalumlrhodium, chromium, and gold.

26. The method of claim 22, wherein the chemical etch removes little if any of the gap layer which comprises a non-magnetic metal.

27. The method of claim 22, wherein the central notched structure is formed to be symmetrical.

28. The method of claim 22, wherein the second pole piece is centered relative to the pedestal.

29. The method of claim 22, further comprising:
- wherein the second pole piece is centered relative to the pedestal; and
- wherein the central notched structure is formed to be symmetrical.

* * * * *

UNITED STATES PATENT AND TRADEMARK OFFICE
CERTIFICATE OF CORRECTION

PATENT NO. : 7,086,139 B2  
APPLICATION NO. : 10/836136  
DATED : August 8, 2006  
INVENTOR(S) : Lee et al.

Page 1 of 1

It is certified that error appears in the above-identified patent and that said Letters Patent is hereby corrected as shown below:

Col. 14: Line 8: tantalumlrhodium

Changed to

Col. 14: Line 8: tantalum/rhodium

Signed and Sealed this

Fifth Day of June, 2007

JON W. DUDAS  
*Director of the United States Patent and Trademark Office*